United States Patent [19]
Wallace et al.

[11] Patent Number: 4,968,135
[45] Date of Patent: Nov. 6, 1990

[54] SYSTEM FOR PRODUCING PIXEL IMAGE DATA FROM CCITT ENCODED PIXEL DATA

[75] Inventors: Gregory K. Wallace, Newton; Richard H. Lawrence, Hudson, both of Mass.

[73] Assignee: Digital Equipment Corporation, Maynard, Mass.

[21] Appl. No.: 436,925

[22] Filed: Oct. 10, 1989

Related U.S. Application Data

[63] Continuation of Ser. No. 087,030, Aug. 17, 1987, abandoned.

[51] Int. Cl.$^5$ .......................... H04N 1/00; H04N 1/41
[52] U.S. Cl. ............................. 358/261.1; 358/261.3
[58] Field of Search ................. 308/261.3, 261.4, 426

[56]  References Cited

U.S. PATENT DOCUMENTS

| | | | |
|---|---|---|---|
| 4,212,036 | 0/1980 | Nakagome et al. | 358/261.3 |
| 4,571,634 | 0/1986 | Caneschi | 358/261.3 |
| 4,626,921 | 0/1986 | Ohtani et al. | 358/426 |
| 4,716,471 | 0/1987 | Yokomizo | 358/296 |

FOREIGN PATENT DOCUMENTS 0149124 of 0000 European Pat. Off.
6195671 of 0000 Japan.

*Primary Examiner*—Edward L. Coles, Sr.
*Attorney, Agent, or Firm*—Fish & Richardson

[57]  ABSTRACT

An image decoding apparatus including a Huffman decoder for decoding CCITT-encoded image information encoded in both one-dimensional and two-dimensional encoding to sequentially generate individual symbols each associated with a pixel run. A relative address decoder receives each symbol from the Huffman decoder and generates, in response thereto, an item of run length information and a color value representing the color of the pixel run. Finally, a run length decoder sequentially receives the successive items of run length information and uses them in generating sequential words for transmission to, for example, a display device. The run-length decoder iteratively receives run-length information comprising a length value and a data value and generates in response thereto a series of fixed-length data words of predetermined length. The run-length decoding apparatus includes a run pointer control circuit and a data word creator circuit. The pointer control circuit generates, in response to each item of run-length information, a pointer identifying the end, within the data word, of a run. In response to each pointer, the data word creator circuit inserts into the word data bits representative of the data value. The pointer control circuit and data word creator circuit operate iteratively to generate successive data words as the sequential items of run-length information are received.

30 Claims, 11 Drawing Sheets

SYSTEM FOR PRODUCING PIXEL IMAGE DATA FROM CCITT ENCODED PIXEL DATA

This is a continuation of copending application Ser. No. 07/087,030 filed on Aug. 17, 1987, now abandoned.

BACKGROUND OF THE INVENTION

1. Field of the Invention

The invention relates generally to the field of digital data processing systems and more particularly to systems for producing pixel image data for processing or display in response to input pixel data encoded according to CCITT standards.

2. Description of the Prior Art

Digital images are defined in terms of picture elements, or "pixels", with each pixel being the smallest unit of an image which the data processing system can process and display. Generally, to achieve a minimum resolution, an image has on the order of two hundred pixels per linear inch, thus requiring approximately forty thousand (that is, the square of two hundred) pixels per square inch of the image. If the linear image resolution is increased by fifty percent, to three hundred pixels per linear inch, which provides a much better image quality, the number of pixels per square inch is more than doubled to ninety thousand. Such large numbers of pixels even at the low (two hundred pixels per inch) resolution would require transmission of vast amounts of digital data if each pixel required even a bit of data. Over the years, the CCITT has developed several encoding schemes to reduce the amount of data required to be sent in connection with image transmission used, for example, in facsimile equipment. Each of the successive encoding schemes has been more complex than the previous, with the greater complexity permitting more image information to be transmitted in less time.

In CCITT encoding, an image is divided into a series of lines, with each line having a predetermined number of pixels. In particular, each inch of an image may have on the order of two hundred lines, and each inch in a line has on the order of two hundred pixels. Rather than sending the color of each pixel, information is sent, in the form of symbols, identifying the number of pixels in a line of a given color. In early, less-sophisticated encoding schemes, the image information was "one dimensional", that is, each CCITT information symbol indicated a number of pixels and a color, and the successive symbols define the colors of the pixels in a line. An end of line symbol identified the end of a line. In more recent encoding schemes, some image information may be "two-dimensional", that is, information concerning a series of contiguous pixels of a given color in a line, or a "pixel run", may reference white-to-black or black-to-white transitions in the previous line. This two-dimensional scheme complicates encoding and decoding, but it typically reduces the amount of information which need be sent, since in most images the color transitions in one line are close to transitions in the adjacent lines. Generally, information concerning an image is encoded in a combination of one- and two-dimensional encoding, that is, image information for a line in an image is encoded using one-dimensional encoding, and then the next few lines are encoded using two-dimensional encoding. To further reduce the amount of image information required to be sent, the information is Huffman-encoded.

While the CCITT descriptions of its encoding schemes substantially describe the encoding apparatus, the decoding and utilization equipment is largely left to the equipment designer. Current decoding apparatus is somewhat slow. Current decoding apparatus is sufficiently fast to decode CCITT-encoded image information which is transmitted, for example, at the slow rates that it can be transmitted over the telephone lines, which is the primary use for CCITT-encoded information. However, these decoding speeds are typically much to slow for many other uses, for example, in typical computer systems, in which data transmission can be several orders of magnitude higher, particularly when the image information is encoded in the CCITT's recently-developed two-dimensional encoding schemes.

Another problem arises, for example, when the decoded CCITT-encoded image information is to be used in controlling a video display in a digital data processing system. Typically, the video display receives video information a selected number of digital binary data bits, for example, sixteen bits, at a time, with each group of sixteen bits being termed a "word". Each data bit represents the color of a pixel in an image, and so each word represents the color of sixteen sequential pixels in a line. A group of sequential words provides the color information for pixels in a line, and a series of sequential groups provide the color information for all of the pixels in an image. However, the CCITT-encoded image information may be decoded into a color and a run length, that is, the number of sequential pixels in a line having the particular color. This complicates the generation of individual data words required to be generated for the display.

SUMMARY OF THE INVENTION

The invention provides a new and improved image decoding apparatus for decoding CCITT-encoded image information.

The invention further provides a new and improved run-length decoding apparatus for iteratively generating fixed length data words in response to run length-encoded data which specifies a data value and a run length.

In brief summary, the new image decoding apparatus includes a Huffman decoder for decoding the CCITT-encoded image information encoded in both one-dimensional and two-dimensional encoding to sequentially generate individual symbols each associated with a pixel run. A relative address decoder receives each symbol from the Huffman decoder and generates, in response thereto, an item of run length information and a color value representing the color of the pixel run. Finally, a run length decoder sequentially receives the successive items of run length information and uses them in generating sequential words for transmission to, for example, a display device.

In another aspect, a run-length decoding apparatus iteratively receives run-length information comprising a length value and a data value and generates in response thereto a series of fixed-length data words of predetermined length. The run-length decoding apparatus includes a run pointer control circuit and a data word creator circuit. The pointer control circuit generates, in response to each item of run-length information, a pointer identifying the end, within the data word, of a run. In response to each pointer, the data word creator circuit inserts into the word data bits representative of the data value. The pointer control circuit and data word creator circuit operate iteratively to generate successive data words as the sequential items of run-length information are received.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

General Discussion

Figure 1:
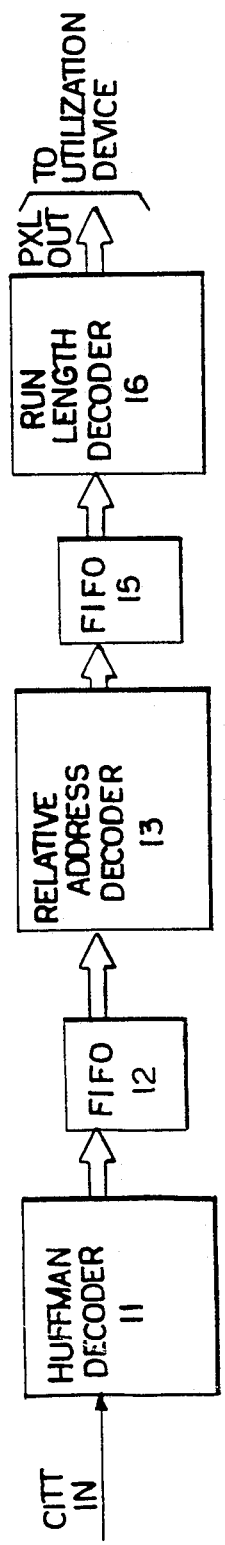
FIG. 1 is a general block diagram of an image processing system constructed in accordance with the invention.

With reference to FIG. 1, a new CCITT decoder 10 constructed in accordance with the invention includes a Huffman decoder 11 which receives and decodes signals representing the serial Huffman-encoded CCITT symbols to identify each symbol. The Huffman decoder 11 generates parallel signals forming a block code symbol identifying each separate CCITT symbol. Signals representing each symbol identified by decoder 11 are coupled to and latched in a first-in first-out (FIFO) buffer 12. In one embodiment, Huffman decoder 11 is essentially a conventional tree decoder and will not be discussed further here. A relative address (READ) decoder 13 iteratively retrieves signals representing each symbol from the buffer 12, determines whether the symbol is horizontally encoded or vertically encoded, and generates in response thereto signals representing horizontally-encoded image data. In that operation, the relative address decoder uses previously decoded image data which it stores in a line buffer 14. The relative address decoder 13 produces successive words of pixel run data, with each representing the length of a pixel run in a line in an image and the color of the run, that is, whether the run is, for example, white or black. Signals representing the successive words of pixel run data from the relative address decoder 13 are coupled to, and latched in, a second first-in first-out buffer 15. Finally, a run length decoder 16 iteratively retrieves each word of pixel run data and generates, in response thereto, pixel image data for each individual pixel, which is transmitted to a display, storage or other utilization device (not shown).

CCITT Encoding

Before proceeding further in describing the operation of the decoder 10 depicted in FIG. 1, it will be helpful to briefly describe the CCITT encoding of image data. CCITT encoding for Group 3 facsimile apparatus is defined in its Fascicle VII.3--Recommendation T.4 and essentially includes two types of encoding, namely, a one-dimensional encoding, in which the pixel image data in each line is defined by run lengths identifying the number of sequential black and white pixels in the line, and a two-dimensional encoding in which the pixel image data in a line is generally defined in relation to the previous line, and particularly to the color transitions in the previous line. Each line ends in an end-of-line symbol. The first line of an image is transmitted using one-dimensional encoding, and subsequent lines are typically transmitted using two dimensional encoding, with each line using the previous line as the reference.

In one dimensional encoding, the number of pixels of a particular color (that is, black or white) is identified by a terminator symbol which defines the color (black or white) and the run length, that is, number of pixels in the run. Each color has an assigned set of terminator symbols. Each terminator symbol is identified by a Huffman-encoded symbol represented by one or more binary digits. Each terminator symbol also contains run-length information. In particular, each terminator symbol in the set assigned to each color identifies a particular number of pixels which have the associated color. If the run length of the color in the image is greater than can be accommodated by one terminator, several terminators of can be used sequentially, or fill symbols may be used to identify the additional pixels. The fill symbols do not identify a color, and so if a fill symbol is used, the next terminator identifies the color of the pixel. The end of each line is marked by an end of line symbol.

Figure 2A:
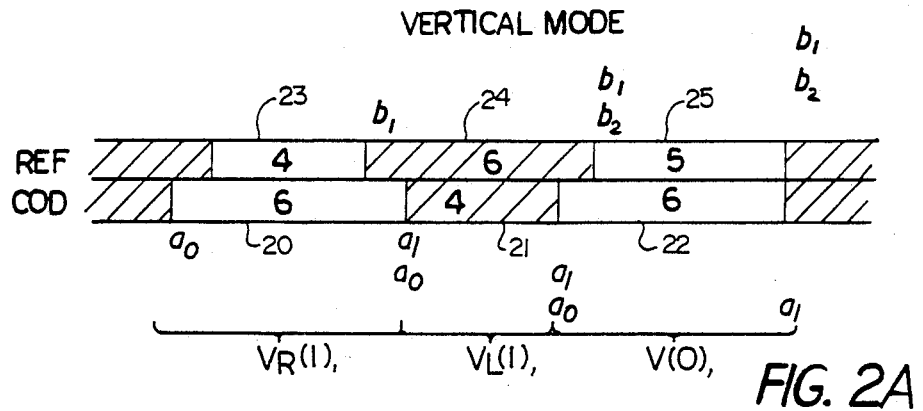
FIGS. 2A through 2C are diagrams useful in understanding the operation of the system depicted in FIG. 1

In two-dimensional encoding, the symbols are divided into three different encoding modes, namely, a vertical mode which will be described in connection with FIG. 2A, a horizontal mode described in connection with FIG. 2B, and a pass mode described in connection with FIG. 2C, all of which use the color transitions in the previous line to define transitions in a current line. The vertical mode, depicted in FIG. 2A, is used if the white-to-black or black-to-white transition in the current line, marked "COD" (that is, the line being encoded or decoded) in FIG. 2A, is within three pixels of a transition in the previous line, which is marked "REF" (that is, the reference line) in FIG. 2A. Seven vertical mode symbols are used to identify each of the seven conditions in which the vertical mode can be used. One vertical mode symbol is used to indicate when a transition ending a run in the current line is in the same location as the transition ending the associated run in the reference line. The remaining six vertical mode symbols are used to indicate that a transition ending a run in the current line is one, two or three pixels to the left or right of a transition ending the associated in the reference line.

FIG. 2A depicts three successive pixel runs identified by reference numerals 20, 21 and 22 in the current line COD. The first run, identified by reference numeral 20, has six pixels with the color white. Run 20 is referenced against a four pixel white run, identified by reference numeral 23. Run 20 begins one pixel to the left of the left end of run 23 and thus ends one pixel to the right of the right end of run 23. The left end of run 20 is defined by the right end of the run (not identified by reference numeral in FIG. 2A) to the left of run 20, and thus is defined by the vertical mode symbol (not shown) which is used to identify that run. The right end of run 20 is defined by the vertical mode symbol $V_R(1)$, which has a binary-encoded value indicating that the right end of run 20 extends one pixel to the right of the end of the run 23.

Similarly, run 21, which is a four-pixel run of the color black, is referenced against a six pixel black run 24 in the reference line REF. It will be appreciated that the right end of run 21 is one pixel to the left of the right end of run 24, and so that end is defined by the vertical mode symbol $V_L(1)$, which has a binary encoded value indicating that the right end of run 21 terminates one pixel to the left of the end of run 24.

Finally, run 22, which is a six pixel run of the color white, is referenced against a five pixel white run 25 in the reference line REF. It will be appreciated that the right end of run 22 is at the same pixel as the right end of run 25, and so that end is defined by the vertical mode symbol V(0), which has a binary-encoded value indicating that the right end of run 21 is at the same pixel as the right end of run 25.

It will be appreciated that the vertical mode symbols do not identify the color of the pixels comprising a run. The color is inferred from a color identification initializing the beginning of a line and the fact that the ends of the respective runs essentially identify color transitions.

The horizontal mode is used to identify transitions in a current line COD which occur too far to the left of a transition in the reference line REF to be identified by the vertical mode symbols. FIG. 2B depicts a current line COD in which there are transitions which define five successive runs 30 through 34 over seventeen consecutive pixels, which occur during a single seventeen pixel run 35 having the color white in the reference line REF. In the horizontal mode, the first two runs, namely the three-pixel white run 30 and the four-pixel black run 31, are successively identified by the symbols used to identify runs in one-dimensional encoding, with the pair of one-dimensional symbols being preceded by a horizontal mode symbol denoted in the Figure by the letter H. Each successive pair of one-dimensional symbols is preceded by the horizontal mode symbol H. Since the white run 30 has three pixels, it is identified by the one-dimensional three-pixel white terminator symbol, identified on the FIG. by $TW_3$, and since the black run 31 has four pixels, it is identified by the one-dimensional four-pixel white terminator symbol identified on the FIG. by $TB_4$. (In the Figure, the letter "T" identifies the symbol as a terminator, "W" and "B" identifies the color as white or black, and the subscript number identifies the number of pixels.) It will be appreciated that, if the run 30 or 31 is too long to be identified by a terminator symbol alone, appropriate fill symbols may also be used as described above.

The next two runs 32 and 33 are encoded as described above in connection with runs 30 and 31. The last run, a one-pixel white run 34, terminates, at the right end, at the same pixel at which run 35 in the reference line REF terminates. Accordingly, the right end of run 34 is defined by the vertical mode symbol V(0).

The pass mode is used in encoding a current line COD if a run is sufficiently long as to extend past at least two transitions in the reference line REF. With reference to FIG. 2C, the reference line includes five successive runs 40 through 44 of alternating colors, with runs 40, 42 and 44 being white and runs 41 and 43 being black, and the current line COD has a single white run 45. The left most pixel of run 45 corresponds to the leftmost pixel in run 40 and the right most pixel in run 45 corresponds to the right most pixel in run 44. The run 45 is encoded with two successive pass symbols, identified by the letter P in FIG. 2C, and a V(0) vertical mode symbol. The first pass symbol P indicates that the run 45 extends to the right beyond the right end of black run 41 and the second pass symbol P indicates that the run 45 extends to the right beyond the right end of black run 43. The final V(0) symbol indicates that the right end of white run 45 corresponds to the right end of white run 44.

In two-dimensional encoding, each line is also terminated in an end of line symbol. In addition, an image is encoded with a reference line before the first actual image line to provide a reference line for the first actual image line. To reduce the possibility that errors which may accumulate in successive lines largely or exclusively encoded in vertical mode become too severe, periodically an entire line in an image is encoded so that all runs are defined in horizontal mode. Since these lines are effectively encoded in one-dimensional form, and do not reference adjacent lines, errors in the adjacent lines do not progress to subsequent lines.

Specific Description

With this background, the structure and operation of the relative address decoder 13 will be described in connection with FIGS. 3, which depict data structures, and 4A through 4G, which depict the operations performed by the relative address decoder in decoding the successive symbols from the Huffman decoder 11 to operate the color and run length information for transmission to the run length decoder 16.

Figure 2B:
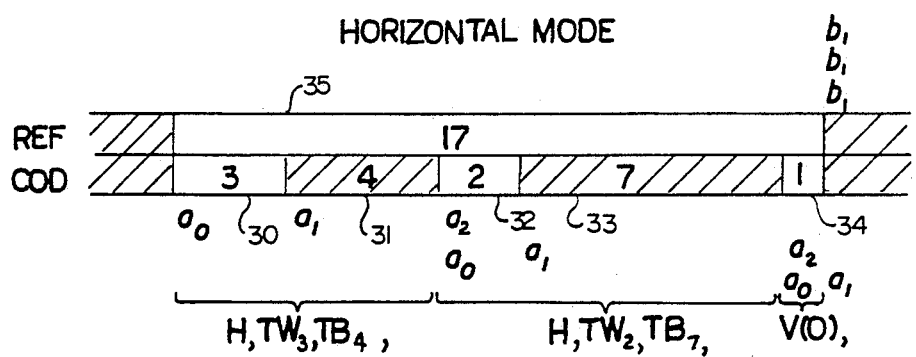
Figure 2C:
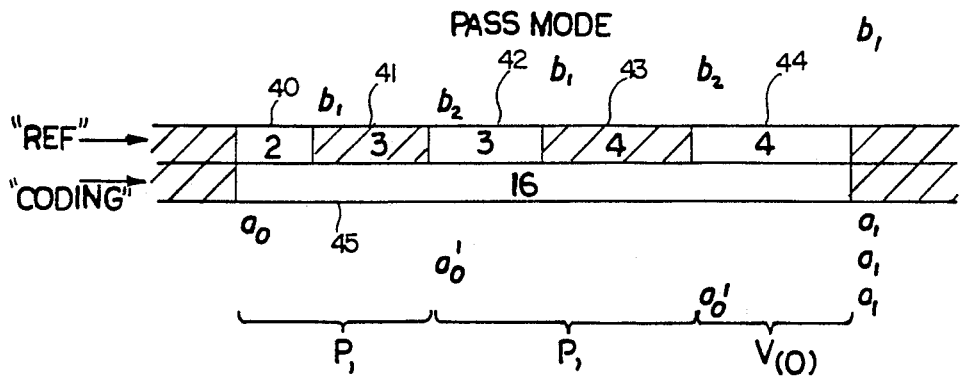
Figure 3:
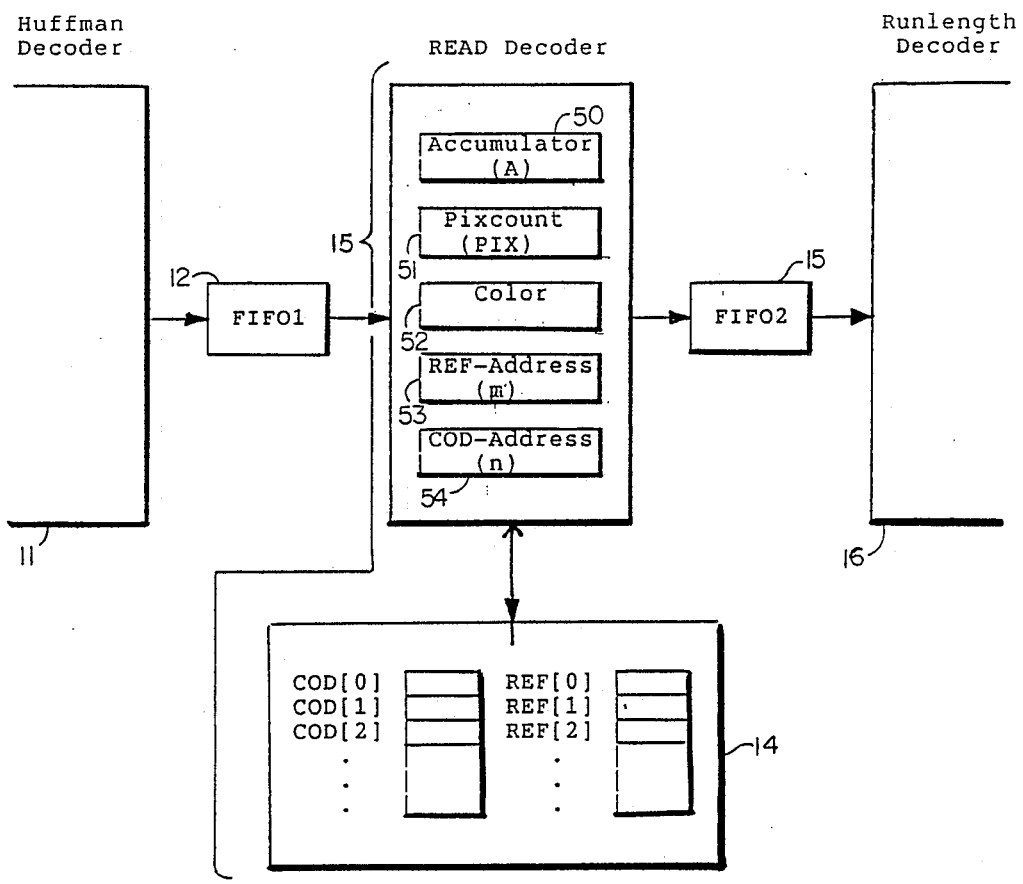
FIG. 3 is a diagram of data structures used by the relative address decoder in the system depicted in FIG. 1.

With reference to FIG. 3, in its operation the relative address decoder 13 uses five registers are two decoded run lists stored in a memory 14. One run list is identified in FIG. 3 as a COD[m] current line decoded run list ("m" is an integer representing an index). The COD[m] current line decoded run list contains a plurality of entries, each identified by a different index "m", which sequentially receive information about the sequential runs in the current line COD (FIGS. 2A–2C) during the decoding operation. The information stored in each entry in the COD[m] run list includes the number of pixels in a run and a color value identifying the pixels in the run as being black or white.

The second run list in memory 14 is identified as the REF[n] reference line run list ("n" is an integer representing an index) and contains information about the runs in the reference line REF (FIGS. 2A–2C). Each entry in the REF[n] run list also includes the number of pixels and a color value in a run, which is used in decoding the current line COD. Thus, the number of entries in the COD[m] current line run list and the number of entries in the REF[n] reference line run list are related to the number of runs of sequential pixels in the current line COD and reference line REF (FIGS. 2A–2C) of sequential pixels each having the same color value. After the current line COD is decoded, the information stored in the entries in the COD[m] current line run list is transferred to entries having the corresponding indices in the REF[n] reference line run list, to be used as reference values for decoding the next line.

The five registers used by relative address decoder 13 include an accumulator register 50, a pixel count register 51, a color register 52, and two pointer registers 53 and 54. The pointer registers include a reference pointer register 53 which contains a pointer "m" to an entry in the REF[n] reference line run list and a current pointer register 54 which contains a pointer "n" to an entry in the COD[m] current line run list.

The accumulator register 50 operates as a scratchpad register which normally stores a value which identifies the number of pixels from the rightmost end of the previous run in the current line COD to the rightmost end of the run in the reference line REF which is being used as the reference for the run in the current line COD which is represented by the symbol being processed. That value corresponds to the sum of (a) the number of pixels in the run in the reference line REF which is used as a reference for the run in the current line COD represented by the symbol being processed and (b) a value corresponding to the relative displacement between the transitions marking the leftmost end of the run in the reference line REF and the rightmost end of the previous run in the current line COD.

The pixel count register 51 contains a value which identifies the number of pixels in the current line COD which have been processed. The color register 52 contains a value which identifies the color of the pixels in the run currently being processed; normally the color identified by the color register is either white and black.

Figure 4A:
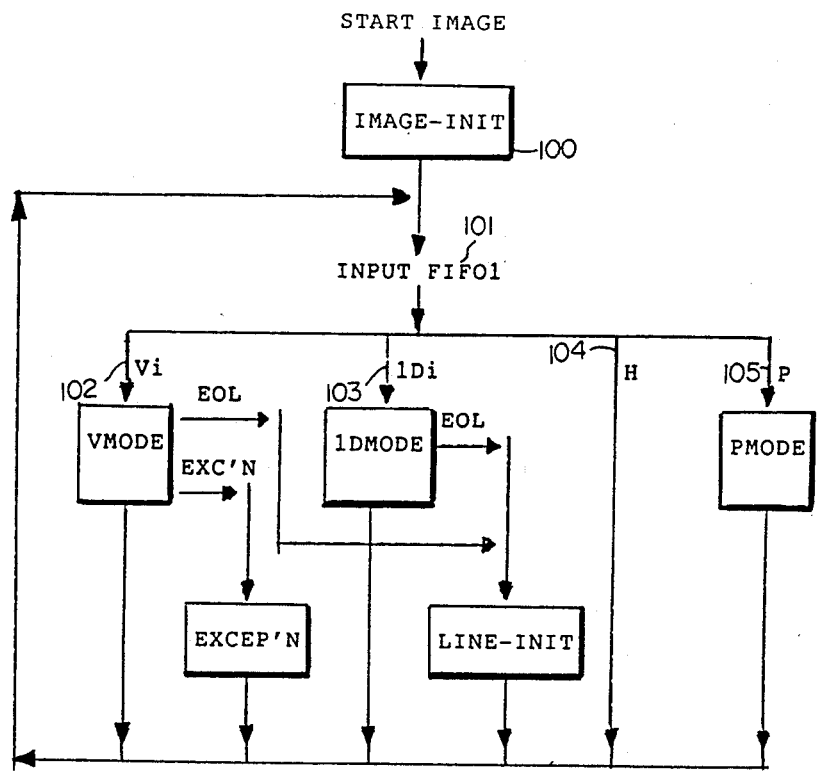
FIGS. 4A through 4G are flow diagrams which, along with FIG. 3, are useful in understanding the operation of the relative address decoder in the system depicted in FIG. 1.
Figure 4B:
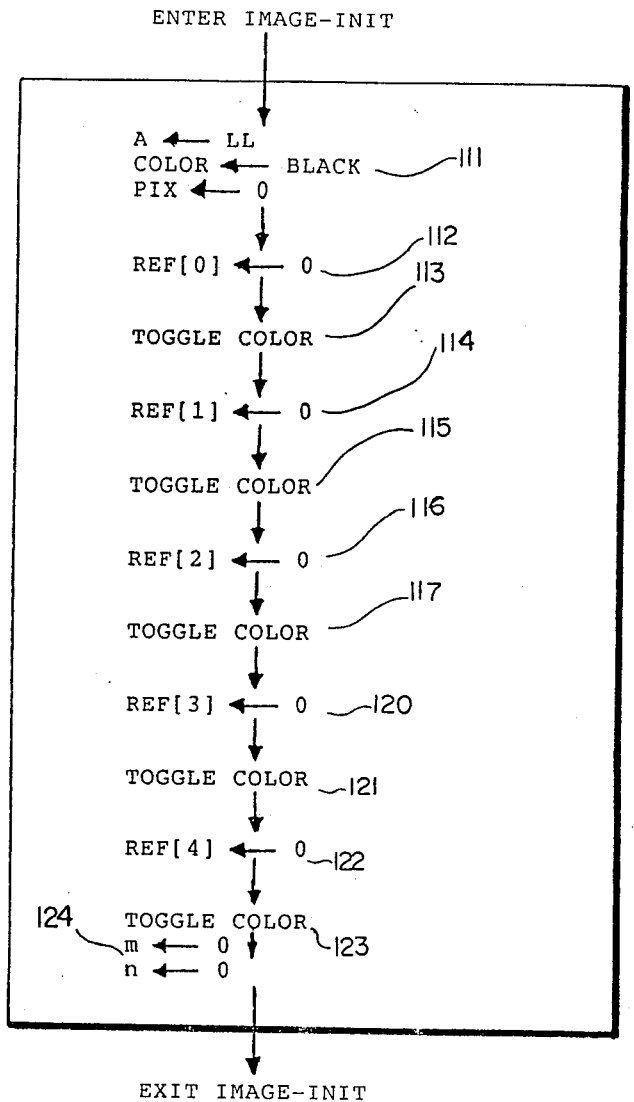

The general operation of the relative address decoder 13 is depicted in FIG. 4A, and the specific operation of the decoder in response to the receipt of each symbol from the FIFO buffer 12 is depicted in FIGS. 4C-4G. An image initialization procedure is depicted in FIG. 4B. With reference to FIG. 4A, the relative address decoder 13 first performs the image initialization procedure, which is used only when it begins processing an image (step 100), and then retrieves a symbol from the buffer 12 (step 101) and branches to one of four sequences 102 through 105 depending on the type of the symbol. After processing the selected sequence, the relative address decoder returns to step 101 to obtain another symbol from the buffer 12.

Thus, following initialization at the beginning of the image, the relative address decoder 13 operates in a loop, iteratively processing each of the sequential symbols received from the buffer 12, with processing performed by the relative address decoder 13 depending on the symbol's encoding and mode, until all of the symbols provided by the Huffman decoder 11 (FIG. 1) have been decoded. That is, if the symbol is a vertical mode symbol, the relative address decoder 13 branches to sequence 102. On the other hand, if the symbol is used in one-dimensional encoding, which can occur if the entire image is encoded using one-dimensional encoding or following a horizontal mode symbol ("H" in FIG. 2B) if the image is encoded using two-dimensional encoding, the relative address decoder 13 branches to sequence 103.

However, if a symbol retrieved from the buffer in step 101 is the horizontal mode symbol "H", the relative address decoder 13 branches to sequence 104. In sequence 104, the relative address decoder 13 performs no processing, but instead returns directly to step 101. It will be appreciated from FIG. 2B that, if the symbol is the horizontal mode symbol "H", the symbols which actually define the pixel runs are the next symbols, which are one-dimensional encoding symbols, and so the relative address decoder 13 iteratively branches to sequence 103 to process those symbols.

Finally, if the symbol retrieved from buffer 12 in step 101 is a pass mode symbol "P" (FIG. 2C), the relative address decoder 13 branches to sequence 105 to process the symbol.

The detailed initialization operations performed by relative address decoder 13 during step 101 (FIG. 4A) prior to processing an image are depicted in FIG. 4B. With reference to FIG. 4B, the relative address decoder 13 initially loads a value corresponding to the line length in the accumulator register 50, conditions the color register to identify the color black and loads a zero value in the pixel count register 51 (step 111). The accumulator register 50 thus begins with a value corresponding to the number of pixels in a line, and the pixel count register begins with the value zero. Thereafter, the relative address decoder 13 performs a series of steps (see steps 112 through 117 and 120 through 123) in which it loads a zero value in each of the sequential REF[n] entries and after each loading toggles the color value in the color register 52. Thus, at the end of step 113, the REF[0] entry in the REF[n] reference line run list contains the value zero and the color register has the value white. Similarly, at the end of step 115, the REF[1] entry in the REF[n] reference line run list contains the value zero and the color register has the value black. This continues until the value zero has been loaded into all of the entries in the REF[n] reference line run list. Preferably, there are an odd number of entries in the REF[n] reference line run list so that the color register 52 will end the image initialization step 101 (FIG. 4A) with the value white; if there are an odd number of entries in the REF[n] reference line run list, the color register would end up with the value black.

After the REF[n] reference line run list and color register are initialized, the image initialization step 101 ends with step 124, in which both pointer registers 53 and 54 are loaded with the value zero. Thus, the "m" and "n" outputs of the pointer registers 53 and 54 identify the first entries in their respective lists COD[m] and REF[n].

As noted in FIG. 4A, after image initialization step 101, the relative address decoder 13 begins retrieving the symbols from the first-in first-out buffer 12 and branches to one of sequences 102 through 105. If the symbol is a vertical mode symbol, the relative address decoder 13 branches to the vertical mode processing sequence 102, which is depicted in detail in FIG. 4C.

It will be appreciated that, when the relative address decoder 13 begins processing sequence 102, the contents of the reference pointer register 53 identifies an entry in the REF[n] reference line run list which corresponds to the pixel run in the reference line REF which is to be used as a reference in the processing. The contents of the current pointer register 54 identifies an entry in the COD[n] current line run list which is to receive the run length and color information which the relative address decoder 13 generates in response to the symbol being processed. In addition, the color register 52 initially contains a color value which identifies the color to be assigned the pixel run.

Figure 4C:
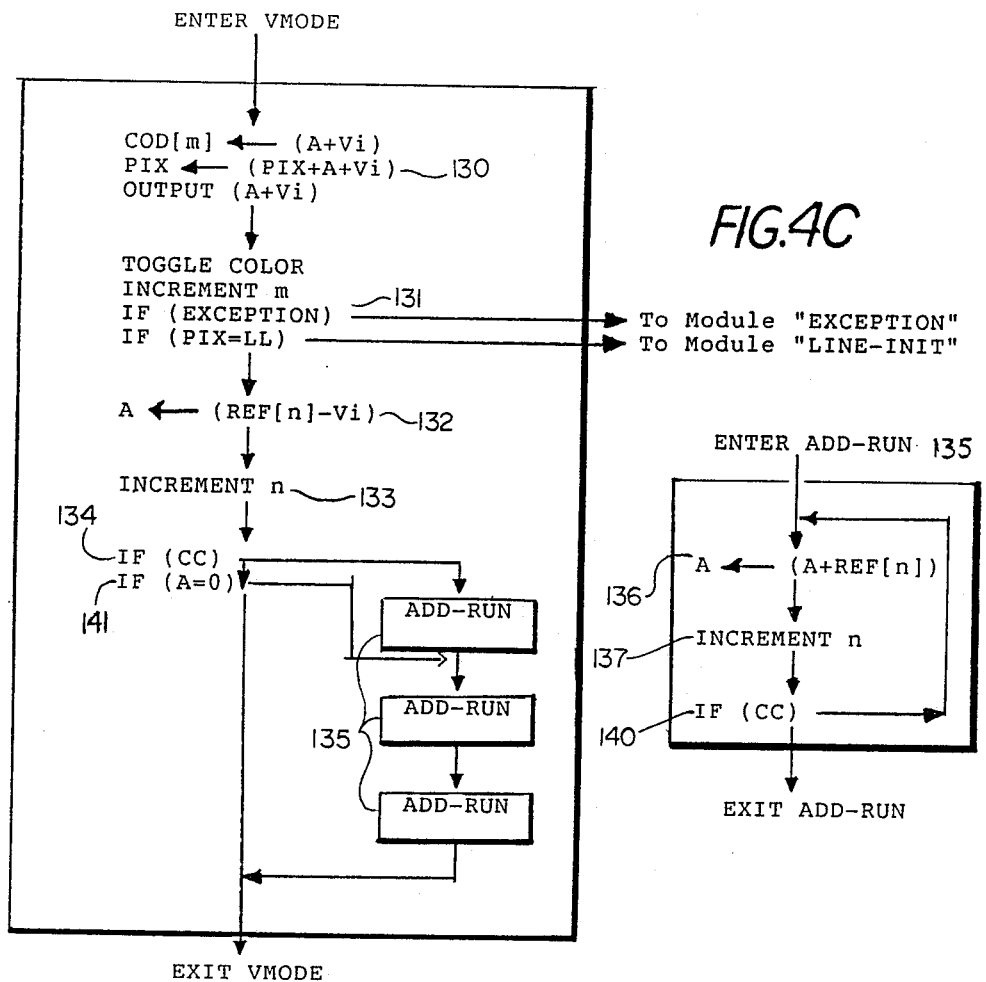

With reference to FIG. 4C, the relative address decoder 13 initially (step 130) adds a value associated with the vertical mode symbol to the value in the accumulator register 50. At this point, the accumulator register identifies the number of pixels in the run in the reference line REF which is referenced to the run in the current line COD, plus the relative displacement of the transitions at the beginning of the respective runs. Thus, with reference to FIG. 2A, in processing run 20, the accumulator register 50 contains the value "five", which indicates to the four pixels in the reference run 23 and a displacement of "one" since the run 20 in the current line COD begins one pixel to the left of the beginning of the run 23.

If the vertical mode symbol being processed defines a right displacement (associated with run 20 in FIG. 2A), the value to be added to the value in the accumulator register 50 is positive, and if the vertical mode symbol defines a left displacement (associated with run 21 in FIG. 2A), the value to be added is negative. The actual quantity to be added corresponds to the number of pixels in the displacement. Thus, in step 130, the result, along with the current color value identified by the color register 52, is stored in the entry in the COD[m] current line run list identified by the contents of the pointer register 54 and transmitted to the FIFO buffer 15 for processing by the run length decoder 16. The contents of the pixel count register 51 are also incremented by an amount corresponding to the result.

Following step 130, the relative address decoder 13 sequences to step 131, in which it toggles the color value in the color register and increments the contents of the reference run list pointer register 53 to point to the next entry in the REF[n] reference line run list. In addition, the relative address decoder 13 tests for two conditions, namely, an exception condition and an end-of-line condition, both of which will be described below.

Assuming that relative address decoder 13 does not encounter either condition in step 131, the relative address decoder 13 then sequences to step 132, in which it prepares the accumulator register 50 for processing the next symbol from the first-in first-out buffer 12. In this preparation, the relative address decoder subtracts the vertical displacement value from the value stored in the entry in the REF[n] reference line run list identified by the reference run list pointer register 53 and inserts the value into the accumulator register. If the vertical mode symbol being processed identifies a left displacement, since the value is negative, the result is larger than the value stored in the entry in the REF[n] reference line run list, and if the symbol identifies a right displacement, since the value is positive the result is less than the value stored in the entry in the REF[n] reference line run list. For example, if run 20 (FIG. 2A) is being processed, at this point the value stored in the entry in the REF[n] reference line run list contains the value "six", corresponding to run 24, and the vertical mode symbol identifies a right displacement of one pixel. Accordingly, the value stored in the accumulator register during step 132 is the value "five", which corresponds to the value "six" minus the value "one", the value "five" identifying the number of pixels in run 24 to the right of the end of run 20. The relative address decoder 13 then increments the contents of the current run list pointer register 53 to point to the next entry in the COD[m] current line run list (step 133). At this point, reference run list pointer register 53 and the current run list pointer register 54 both point to entries in the respective run lists which are associated with the next run in the reference line REF and current line COD, respectively.

Following step 133, the relative address decoder 13 sequences to step 134 in which it determines whether a "change color" ("CC") condition exists. In determining whether a change color condition exists, the relative address decoder 13 compares the color values of the entry in the REF[n] reference line run list identified by the reference run list pointer register 53, and the previous entry in the REF[n] reference line run list. It will be appreciated that, since the contents of the reference run list pointer register were incremented in step 131, the change color condition is determined as between the pixel run in the reference line REF which was used in step 132 and the next pixel run.

If a change color condition does not exist, the next run in the reference line REF has the same color value as the pixel run which was used in step 132, and so the relative address decoder 13 sequences to perform three successive "ADD-RUN" sequences 135. In an ADD-RUN sequence, the relative address decoder 13 adds to the contents of the accumulator register 50 the run lengths of the successive entries in the REF[n] reference line run list which have the same color. After ending the ADD-RUN sequence, the accumulator register 50 contains a value identifying the total number of pixels to the right of the transition in the run in the current line COD being processed, to the point in the reference line REF at which a color transition occurs.

The ADD-RUN sequence 135 comprises a three step sequence. Initially, the run length value in the entry in the REF[n] reference line run list identified by the reference list pointer register 53 is added to the contents of the accumulator (step 136). The current list pointer register 54 is incremented (step 137), and the change color condition is again tested (step 140). If the change color condition again does not exist, the relative address decoder 13 returns to step 136 to repeat the ADD-RUN sequence 135.

If, in steps 134, a change color condition does exist, the relative address decoder 13 sequences to step 141 in which it tests the contents of the accumulator register 50. If the accumulator register 50 contains the value "zero", the relative address decoder 13 performs two successive ADD-RUN sequences 135. Otherwise, the relative address decoder 13 exits sequence 103 and returns to step 101 (FIG. 4A) to retrieve the next symbol from the buffer 12.

Figure 4D:
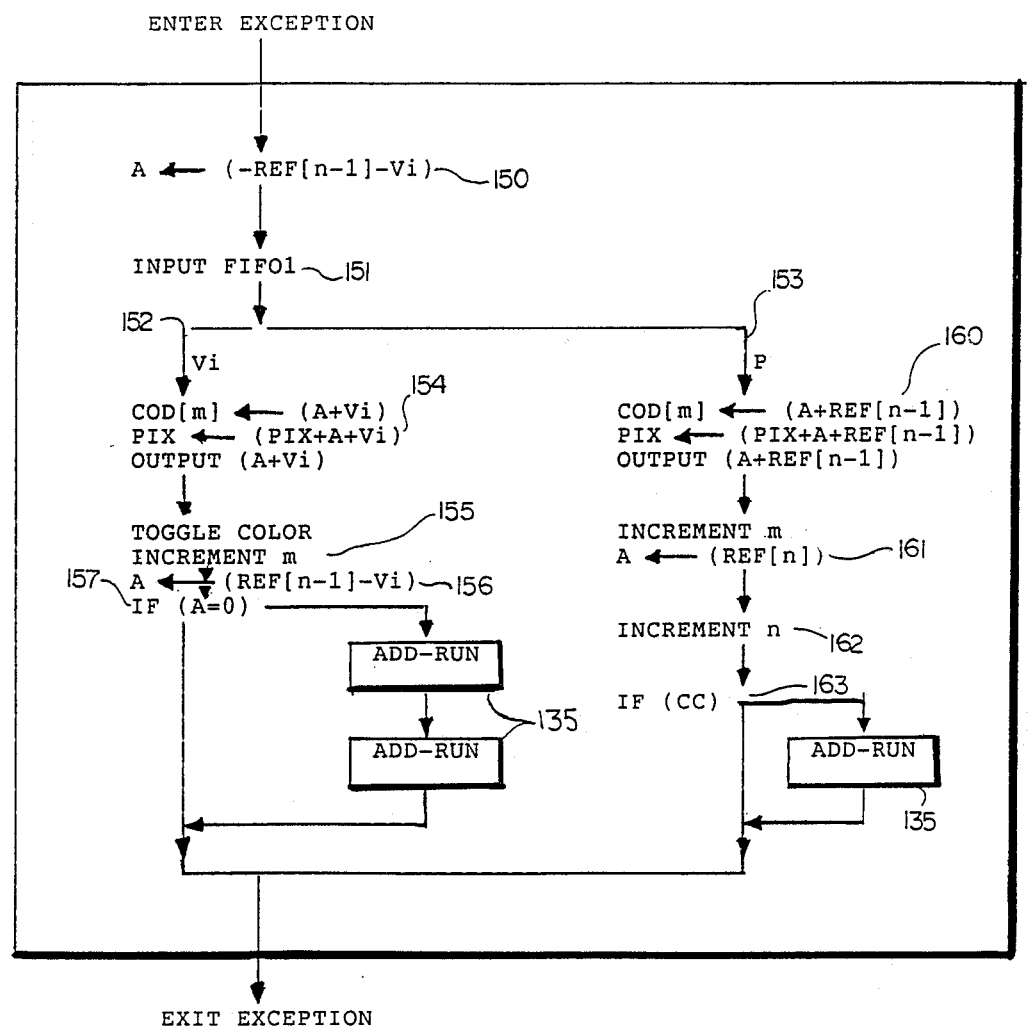

As noted above in connection with step 131, the relative address decoder 13 may detect an exception condition and, if so, it sequences to an exception routine depicted in FIG. 4D. An exception condition exists in CCITT encoding which requires special handling if the vertical mode symbol indicates a leftward displacement which is greater than the pixel run length value in the entry in the REF[n] reference line run list preceding the one identified by the reference list pointer register 53, that is, the entry associated with the run in the reference line REF against which the run in the current line COD is being compared. This can occur if (a) the entry in the REF[n] reference line run list contains a run length of one pixel, and the vertical mode symbol indicates a leftward displacement of two pixels, or (b) if the REF[n] reference line run list contains a run length of one or two pixels and the vertical mode symbol indicates a leftward displacement of three pixels. If an exception condition occurs, the relative address decoder 13 processes the next symbol from the first-in first-out buffer 12 before returning to step 101 (FIG. 4A).

With reference to FIG. 4D, in processing the exception condition, the relative address decoder 13 first retrieves the pixel run length value from the entry in the REF[n] reference line run list which precipitated the exception condition, negates the value, and subtracts from that the displacement value provided by the symbol being processed (step 150). The result, which is a positive number which represents the number of pixels between the transition in the reference line REF and the transition in the current line COD identified by the vertical mode symbol which gave rise to the exception condition, is then stored in the accumulator register 50

It will be appreciated that the transition in the current line COD is to the left of the transition in the reference line REF.

Following step 150, the relative address decoder 13 retrieves the next symbol from the first-in first-out buffer 12 and branches to one of two sequences 152 or 153 depending on the type of symbol. In particular, the symbol may be one of two types, namely a vertical mode symbol, which is processed in sequence 152, or a pass mode symbol, which is processed in sequence 153. In sequence 152, the relative address decoder 13 performs step 154, which is essentially similar to step 130 (FIG. 4C) to determine the number of pixels in the pixel run terminated by the just-retrieved vertical mode symbol. In step 154, the relative address decoder 13 adds the displacement value represented by the vertical mode symbol to the contents of the accumulator register 50. The result, along with the current color value of the color register 52, is stored in the entry in the COD[m] run list identified by the current run list pointer register 54 and transmitted to buffer 15 for use by the run length decoder 16.

Following step 154, the relative address decoder 13 sequences to step 155, in which it toggles the color value in the color register 52 and increments the contents of the reference run list pointer 53 to point to the next entry in the REF[n] reference line run list. The relative address decoder 13 then (step 156) retrieves the pixel run length from the entry of the REF[n] reference line run list identified by the reference run list pointer 53 before it was incremented in step 155 and subtracts the pixel displacement value identified by the vertical mode symbol and stores the result in the accumulator register. The result identifies the number of pixels from the transition in the run in the current line to the next transition in the run in the reference line REF. If the result is zero (step 157), the relative address decoder 13 sequences to perform two ADD-RUN steps 135 (see FIG. 4C). If the result stored in the accumulator register is not zero, or following the second ADD-RUN step 135, the relative address decoder 13 exits the exception sequence and returns to step 101 (FIG. 4A).

If the symbol retrieved in step 151 is a pass symbol, on the other hand, the relative address decoder 13 processes sequence 153. With reference to FIG. 2C, the pass symbol indicates that the pixel run in the current line extends past the next transition. Accordingly, the relative address decoder 13 performs a step 160 in which it generates a pixel run length value which identifies the number of pixels from the previous transition, past a current transition to the next transition. This value corresponds to the sum of the contents of the accumulator register, plus the contents of the entry in the REF[n] reference run list which is identified by the reference run list pointer register 53, decremented by one. The value and the current color value are stored in the entry in the COD[n] current run list identified by the current run list pointer register 54, and also transmitted to the buffer 15 for use by run length decoder 16.

FolloWing step 160, the contents in the reference run list pointer register 53 are incremented to identify the next entry in the REF[n] reference run list, and the contents of the identified entry in the REF[n] reference run list are copied into the accumulator (step 161). The value in the current run list pointer register 54 is also incremented (step 162) and if a change color condition does not exist (step 163), the relative address decoder 13 performs the ADD-RUN operation 135. Following step 163 or the ADD-RUN operation 135, the relative address decoder 13 returns to step 101 (FIG. 4A) to retrieve and process the next symbol.

Figure 4E:
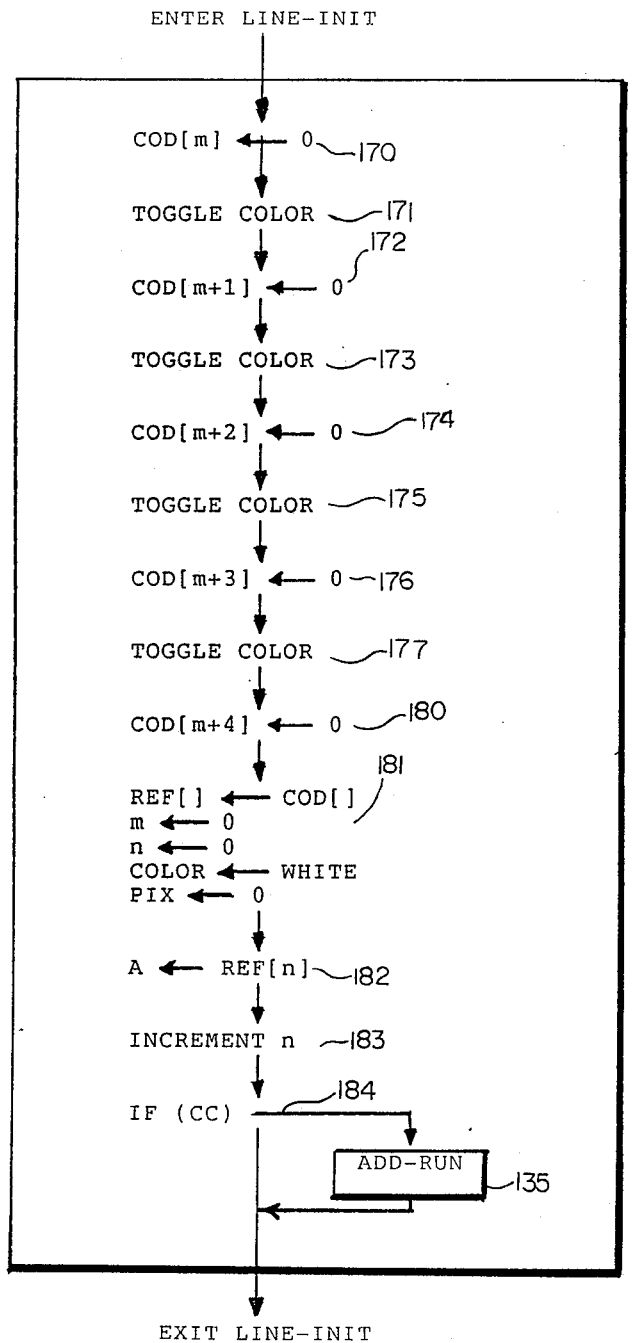

Returning to step 131 (FIG. 4C), if the contents of the pixel count register correspond to the line length, the relative address decoder 13 sequences to a line initialization sequence depicted in FIG. 4E. In that sequence, the relative address decoder 13 conditions its registers 50 through 54 to begin processing the next line in the image. With reference to FIG. 4E, the relative address decoder 13 stores zero pixel run length values, along with the current color value in the color register 52, in five successive entries in the COD[m] current run list, and toggles the color value in the color register 52 after each entry is loaded (steps 170-177 and 180). The contents of the respective entries in the COD[m] current run list are then transferred into the corresponding entries in the REF[n] reference run list, to be used as the reference run list in processing the next line in the image, the contents of pixel count register and pointer registers 53 and 54 are cleared, and the color value in the color register is set to white (step 181).

Following step 181, the relative address decoder 13 initializes the accumulator register 50 with the value from the first entry in the REF[n] reference run list (step 182) and increments the contents of the reference run list pointer register 53 to point to the second entry in the REF[n] reference run list (step 183). If a change color condition does not exist (step 184), the relative address decoder 13 processes the ADD-RUN sequence 135 (FIG. 4C). If, on the other hand, the change color condition does exist in step 184, or following the ADD-RUN sequence 135, the relative address decoder 13 exits the line initialization routine and sequences to step 101 (FIG. 4A) to retrieve the first symbol in the line.

Figure 4F:
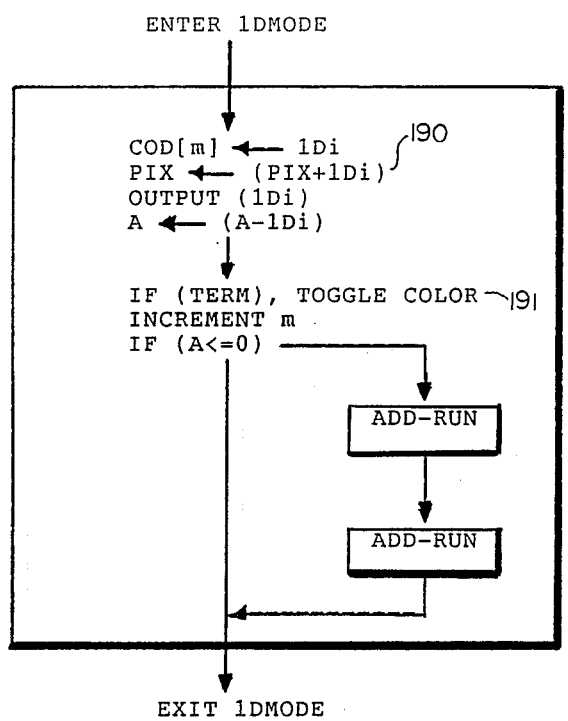

Returning to FIG. 4A, if the symbol retrieved in step 101 is a one-dimensional symbol, the relative address decoder 13 processes the sequence 103, which is depicted in detail in FIG. 4F. Initially, the pixel run length identified by the one-dimensional character and the color value from the color register 52 are loaded into the entry in the COD[m] current run list identified by the contents of the current run list pointer register 54 and are transmitted to the output buffer 15 for use by the run length decoder 16 (step 190). In addition, the contents of the pixel count register 51 is incremented by the pixel run length value. At the same time, the value in the accumulator register, which identifies the number of pixels from the end of the pixel run in the current line COD to the next transition in the reference line, is reduced by the pixel run length value in the symbol retrieved from the input buffer 12 in step 101.

Following step 190, the relative address decoder 13 executes step 191, in which it toggles the color value in the color register 52 if the symbol is a terminator symbol and increments the contents of the reference run list pointer register 53. If the contents of the pixel count register correspond to the line length, the relative address decoder 13 sequences to the line initialization sequence depicted in FIG. 4E. However, if the contents of the accumulator register are zero or negative, which occurs if pixel identified by the pixel count register 51 corresponds to or is to the right of a pixel in the reference line corresponding to the entry in the REF[n] reference run list identified by the contents of the reference run list pointer register 53, the relative address decoder 13 processes two ADD-RUN sequences 135. Otherwise, or following the ADD-RUN sequences, the relative address decoder 13 sequences to step 101 to retrieve the next symbol from the input buffer 12.

Figure 4G:
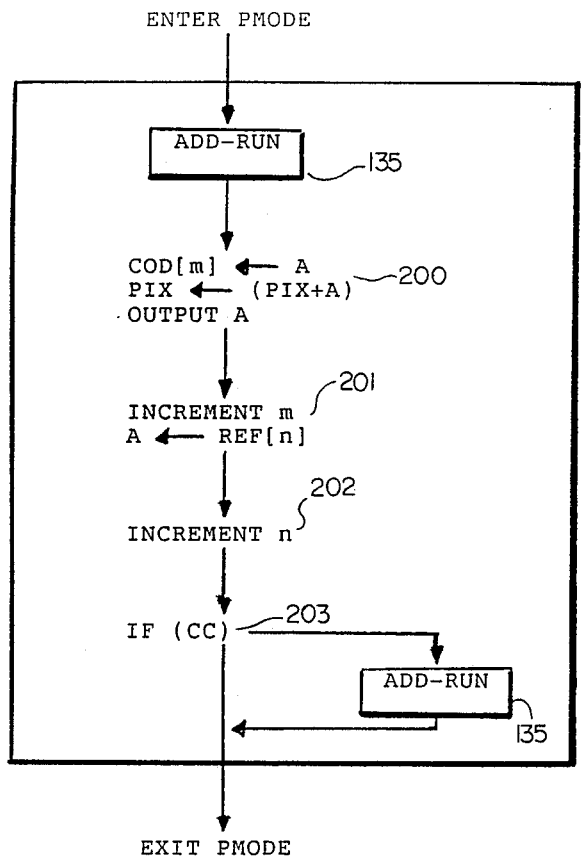

Returning to FIG. 4A, if the symbol retrieved from the input buffer 12 in step 101 is a pass symbol, the relative address decoder 13 processes sequence 105, depicted in detail in FIG. 4G. With reference to FIG. 4G, the relative address decoder 13 first processes an ADD-RUN sequence 135 (depicted in FIG. 4C), which increments the contents of the accumulator register 50 until a change color condition is detected, that is, until a color transition is detected in the reference line REF, based on the entries in the REF[n] reference run list. When the change color condition is detected, the relative address decoder 13 sequences to step 200, in which the contents of the accumulator register 50 and the color value from color register 52 are stored in the entry in the COD[m] current run list and transmitted to the output buffer 15 for use by the run length decoder 16 (step 200). In addition, the contents of the pixel count register 15 are incremented by the value in the accumulator register 50.

Following step 200, the relative address decoder 13 increments the contents of the reference run list pointer register, transfers the identified entry in the REF[n] reference line run list to the accumulator register 50 (step 201) and increments the contents of the current run list pointer register 54 (step 202). If a change color condition does not then exist (step 203), the relative address decoder 13 processes the ADD-RUN sequence 135 to increment the contents of the accumulator register 50 until a change color condition does exist. At that point, when a change color condition is finally located, the value in the accumulator register 50 corresponds to the number of pixels in the run from the previous color transition in the reference line REF. Following step 203, or after the ADD-RUN sequence 135, the relative address decoder 13 returns to step 101 FIG. 4A).

As noted above, the process depicted in FIG. 4A is repeated until there are no more symbols in the input buffer 12 to be processed. At that point, the relative address decoder 13 returns to step 100 to initialize for the symbols associated with the next image.

Run Length Encoder

As mentioned above, the run length decoder 16 (FIG. 1) receives binary encoded color, run length and end of line information concerning each pixel run from the run-length based relative address decoder 13 (FIG. 1) and generates, in response thereto, pixel color information for each individual pixel. The run length decoder 16, in one embodiment, generates the pixel color information in words of sixteen bits each. The value of each bit of pixel color information represents the pixel as having a color of black or white. It will be appreciated that, if a line in an image has more than sixteen pixels, the run length decoder 16 will iteratively generate sixteen bit words of pixel color information sequentially representing the successive sixteen-pixel runs in the line. After each sixteen bit word of pixel color information is generated, it may be transmitted to downstream storage, display or other utilization devices (not shown).

Figure 5:
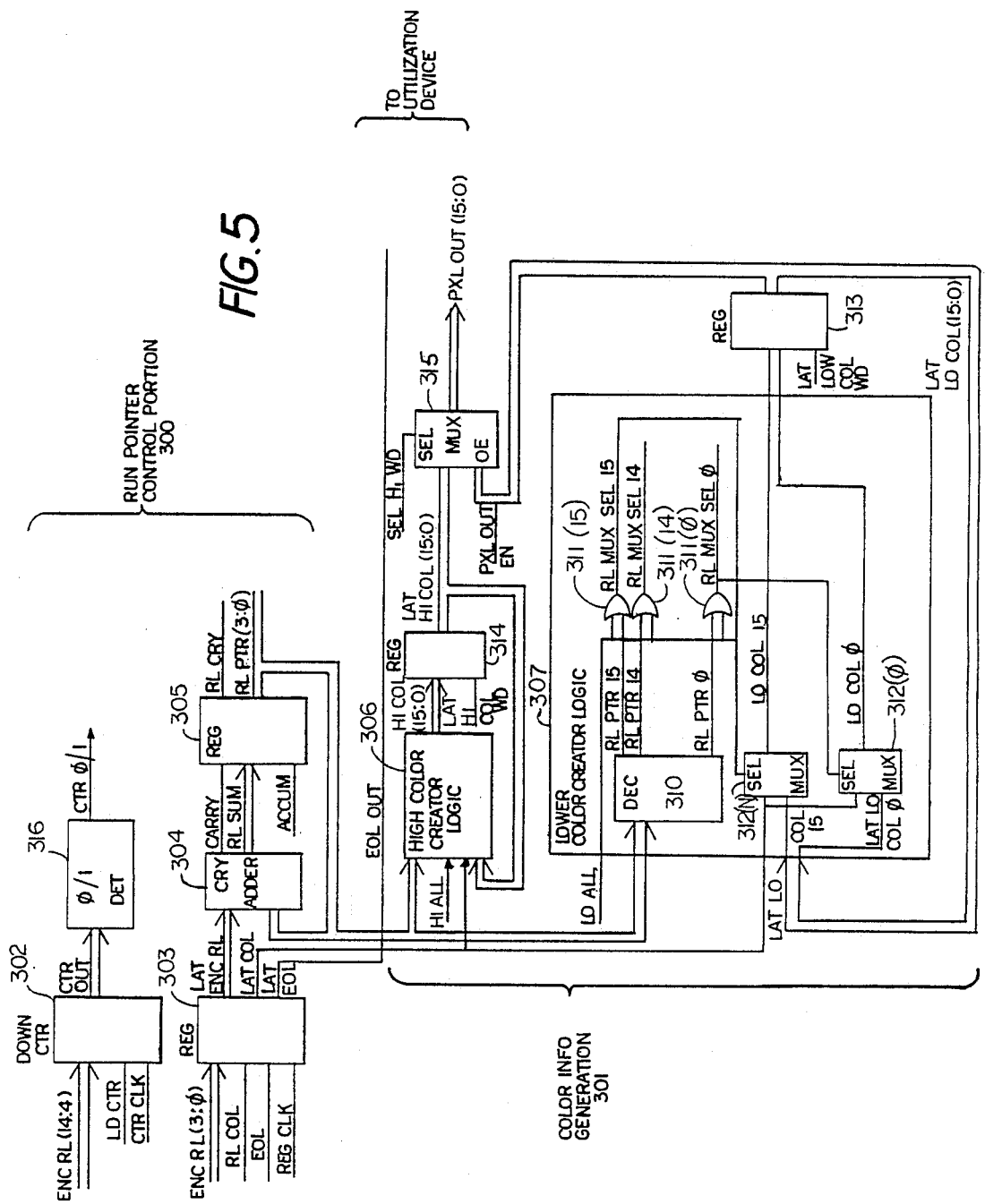
FIG. 5 is a detailed logic diagram of a portion of the image processing system depicted in FIG. 1.

A detailed block diagram of the run length decoder 16 is depicted in FIG. 5. With reference to FIG. 5, the run length decoder 16 includes two portions, namely, a run pointer control portion 300 and a color information generation portion 301. The run pointer control portion 300 controls the location, within a sixteen-bit pixel color information word, of the end of a pixel run. Depending on the location in the pixel color information word of the end of the previous pixel run and the number of pixels in the current pixel run as indicated by the pixel color information received from the relative address decoder 13, it will be appreciated that the run pointer control portion 300 may indicate the end of the pixel run as being either in the current pixel color information word or a subsequent pixel color information word. The color information generation portion 301, under control of the output of the run pointer control portion 300 and the color information from the relative address decoder 13, generates the successive sixteen-bit pixel color information words.

Specifically, with reference to FIG. 5, the run pointer control portion 300 includes a counter 302 and a register 303 which receive signals representing run length, color, and end-of-line information from the first-in first-out buffer 15. The counter 302 receives, from the first-in first-out buffer 15, ENC RL (14:4) encoded run length signals representing eleven high-order run length information bits relating to a pixel run length provided by the relative address decoder 13 and latches them in response to an LD CTR load counter signal from a control circuit (not shown). At the same time, the register 303 latches the ENC RL (3:0) encoded run length signals defining the four low order run length information bits, an RL COL run length color signal identifying the color of the pixels in the run, and an EOL end of line signal which, if asserted, indicates that the pixel run is the last in the line. The entire set of encoded run length signals, that is, the ENC RL (14:0), identifies the total length of a run having the color identified by the RL COL run length color signal. The register 303 latches the respective ENC RL (3:0) low order encoded run length signals, the RL COL run length color signal and the EOL end of line signal in response to a REGISTER CLK register clock signal from the control circuitry. The REGISTER CLK register clock signal is asserted contemporaneously with the assertion of the CTR CLK counter clock signal, and so the counter 302 and register 303 are loaded with pixel run length information from the first-in first-out buffer 15 at the same time.

In brief, the contents of the register 303 are used to form a pointer which is used to identify the endpoint, within a sixteen bit pixel color information word, of a pixel run of a color identified by the RL COL run length color signal. The endpoint of a pixel run is determined from the endpoint of the previous run, and is essentially the sum of the endpoint of the previous run and the value identified by the contents of the register 303, modulo the sixteen-bit word length.

The output of the counter 302, on the other hand, is used to indicate when a run is longer than sixteen bits, which is the longest run which can be defined by the four low order bits latched in register 303. The output of the counter 302 is used in the determination of whether the endpoint of a pixel run of a particular color is in a current pixel color information word or in a successive pixel color information word. The CTR OUT counter output signal generated by the counter 302 are coupled to a circuit 316 which detects when the binary-encoded value of the CTR OUT counter output signal is either zero or one. If the binary encoded value of the CTR OUT counter output signal is zero or one, circuit 316 asserts a CTR 0/1 counter zero/one signal, otherwise the CTR 0/1 counter zero/one signal is negated.

To form a pixel run endpoint pointer, the register 303 transmits LAT ENC RL latched encoded run length signals, which correspond to the previously-latched ENC RL (3:0) low order encoded run length signals, to one input of an adder 304. The adder 304 also receives RL PTR (3:0) run length pointer signals from a pointer register 305. The RL PTR (3:0) run length pointer signals identify a binary-encoded value which defines an end point of the pixel run, within a sixteen-bit pixel color information word, as defined by the previous pixel color information from the first-in first-out buffer 15. The adder 304 generates RL SUM run length sum signals and a CARRY signal which represent the sum of the LAT ENC RL latched encoded run length signals from register 303 and the RL PTR (3:0) run length pointer signals from pointer register 305. The RL SUM run length sum signals represent the pixel run endpoint pointer, within a sixteen bit word, of the pixel run represented by the run length information currently latched in register 303. The CARRY signal, on the other hand, indicates whether the endpoint is in the current sixteen bit word or a subsequent word. After the RL SUM run length sum and CARRY signals are generated by adder 104, the control circuitry (not shown) asserts an ACCUM accumulator signal which enables pointer register 305 to latch them.

The color information generation portion 301 includes two color generator circuits, namely a high-order color creator logic circuit 306 and a low-order color creator logic circuit 307. Since both circuits 306 and 307 are identical, only the low-order color creator logic circuit 307 is shown in detail. With reference to FIG. 5, the low-order color creator logic circuit 307 includes an encoder 310 which receives the RL PTR (3:0) run length pointer signals from pointer register 305 in the run pointer control portion 300. In response to the RL PTR (3:0) run length pointer signals, the decoder 310 asserts or negates selected ones of RL PTR 0 run length pointer (0) through RL PTR 15 run length pointer (15) signals (the RL PTR 0 through RL PTR 15 signals will be generally identified here as RL PTR N signals). In particular, if the RL PTR (3:0) run length pointer signals have the binary-encoded value "zero", none of the RL PTR N signals are asserted. On the other hand, if the RL PTR (3:0) run length pointer signals have the binary encoded value "one", the decoder 310 asserts the RL PTR 0 run length pointer (0) output signal and negates the others. Similarly, if the RL PTR (3:0) run length pointer signals have the binary-encoded value "sixteen", the decoder 310 asserts all of the RL PTR N run length pointer signals. Thus, the decoder 310 asserts the ones of the RL PTR N run length pointer signals for which the value of "N" is below the binary-encoded value of the RL PTR (3:0) run length pointer signals.

The RL PTR N run length pointer signals from decoder 310 are coupled to a set of OR gates 311(0) through 311(15) [generally identified by reference numeral 311(N)], with each OR gate 311(N) receiving the associated RL PTR N run length pointer signal. That is, OR gate 311(0) receives the RL PTR 0 run length pointer signal, OR gate 311(1) receives the RL PTR 1 run length pointer signal, and so forth. In addition, all of the OR gates 31l(N) receive a LO ALL low-order enabling signal from the control circuitry (not shown). Thus, each OR gate 311(N) can be energized either by the assertion of its associated RL PTR N run length pointer signal from decoder 310 or by an asserted LO ALL low-order enabling signal from the control circuitry. If an OR gate 311(N) is energized, it asserts its RL MUX SEL N run length multiplexer select output signal.

The RL MUX SEL N run length multiplexer select output signals from OR gates 311(N) are coupled to select input terminals to control respective multiplexers 312(N). Each multiplexer 312(N) receives, at its data input terminals, the respective one of the sixteen LAT LO COL (15:0) latched low color output signals from a low-order output latch 313 and the LAT COL latched color signal from register 303 in the run pointer control portion 300. Each multiplexer 312(N) couples either the LAT COL latched color signal or the respective one of the LAT LO COL N (where "N" is an integer from zero to fifteen) latched low color signals as a LO COL 0 low-order color (0) through LO COL 15 low-order color (15) output signal, which is latched in the low-order output latch 313 in response to a LAT LO COL WD latch low-order color word signal from the control logic (not shown).

The high-order color creator logic circuit 306 generates HI COL 0 high-order color (0) through HI COL 15 high-order color 15 output signals [identified on FIG. 5 as HI COL (15:0) high-order color signals], which are latched in a high-order latch 314 in response to a LAT HI COL WD latch high-order color word signal from the control logic (not shown).

The LAT LO COL (15:0) latched low-order color signals from low-order output latch 313 and the LAT HI COL (15:0) latched high-order color output signals from high-order latch 314 are both coupled to respective data input terminals of an output multiplexer 315. The multiplexer 315 couples either the LAT LO COL (15:0) latched low-order color signals or the LAT HI COL (15:0) latched high-order color signals as PXL OUT (15:0) pixel color information output signals, which collectively comprise the sixteen-bit output pixel color information word, in response to an SEL HI WD select high-order word signal from the control circuitry (not shown).

With this background, the operation of the run length decoder 16 will be explained. With reference to FIG. 5, when pixel color information from the first-in first-out buffer 15 is retrieved and latched in counter 302 and register 303 in the run pointer control portion 300, the circuit 316 generates the CTR 0/1 counter zero/one output signal and the adder 304 generates the CARRY and RL S1IM run length sum signals. In addition, the register 303 couples the LAT COL latched color signal representing the new pixel color to the high- and low-order color creation logic circuits 306 and 307.

Before enabling the new RL SUM run length sum and CARRY signals to be latched in the pointer register 305, the control circuitry enables the color information generation portion 301 to generate pixel color information using the new value of the LAT COL latched color signal and the old RL PTR (3:0) run length pointer. For example, assuming the low-order color creation logic circuit 307 is being used, the LAT LO COL (15:0) latched low color output signals from color word register are coupled to the respective data input terminals of multiplexers 312(N). In addition, the LAT COL latched color signal is coupled to a data input terminal of all of multiplexers 312(N). The RL PTR (3:0) run length pointer signals from the pointer register 305, which represents the end point of the previous pixel run, are coupled to decoder 310, which asserts the appropriate ones of the RL PTR 0 through RL PTR 15 run length pointer signals as described above. In response, the asserted ones of the RL PTR 0 through RL PTR 15 run length pointer signals energize the respective OR gates 311(N) to, in turn, assert the corresponding RL MUX SEL 0 through RL MUX SEL 15 run length multiplexer select signals.

The RL MUX SEL 0 through RL MUX SEL 15 run length multiplexer select signals control multiplexers 312(N) as follows. If an RL MUX SEL N run length multiplexer select signal from an OR gate 311(N) is asserted, the multiplexer 312(N) couples the corresponding LAT LO COL (N) latched low-order color (N) signal as the LO COL N low-order color output signal. On the other hand, if an RL MUX SEl, N run length multiplexer select signal is negated, the multiplexer 312(N) couples the LAT COL latched color signal as the output LO COL N low-order color signal. Thus, since at this point the RL PTR (3:0) run-length pointer output signals from pointer register 305 identify the end point of the previous pixel run, (a) the multiplexers 312(N) at and below the end point couple the corresponding LAT LO COL (N) latched low-order color signal as the LO COL N low-order color signal to the low-order output latch 313, thereby preserving the previously-determined pixel color information for the corresponding pixel, and (b) the multiplexers 312(N) above the end point couple the LAT COL latched color signal to the low-order output latch 313, thereby inserting the new color into the pixel color information word. The control circuitry then asserts the ACCUM accumulator latch signal to enable the pointer register 305 to latch the output signals from adder 304.

It will be appreciated that, if the CARRY signal is not asserted and if the CTR 0/1 counter zero/one signal from detector circuit 316 is asserted, the pixel run does not extend into the next sixteen-bit pixel color information word. In that case, the operation is complete and the control circuitry (not shown) then enables new pixel color information to be retrieved from the first-in first-out buffer 15 and the process is repeated. This occurs until the entire sixteen bits of the pixel color information word in the low-order output latch 313 is generated, after which the control circuitry uses the high-order color creation logic circuitry 306.

On the other hand, if the CARRY signal is asserted, the pixel run does extend into the next sixteen-bit pixel color information word. In that case, the control circuitry asserts the PXL OUT EN pixel out enable signal and conditions the SEL HI WD select high-order word signal to enable the multiplexer 315 to couple the LAT LO COL (15:0) latched low-order color signals as the PXL OUT (15:0) pixel output signals to the downstream display, storage or utilization device (not shown). In addition, the control circuitry enables the high-order color creation logic circuitry 306 as follows. The control circuitry asserts a HI ALL control signal, which energizes OR gates in high-order color creation logic circuitry 306 corresponding to OR gates 311(N). Thus, multiplexers in circuitry 306 corresponding to multiplexers 312(N) couple the LAT COL latched color signals from register 303 as the HI COL (15:0) high-order color signals. The control circuitry then asserts the LAT HI COL WD latch high-order color word signal, which enables the high-order latch 314 to latch the HI COL (15:0) high-order color signals. The control circuitry then enables ENC RL (14:0) encoded run length, RL COL run length color and EOL end of line signals relating to the next pixel run to be retrieved from first-in first-out buffer 15 and stored in counter 302 and register 303. It will be appreciated that, when operating in response to the newly retrieved ENC RL (14:0) encoded run length, RL COL run length color and EOL end of line signals, the control circuitry uses high-order color creator logic circuitry 306 in the same way as described above in connection with the low-order color creation logic circuitry 307; essentially, the control circuitry alternates between the high-order circuitry 306 and low-order circuitry 307 in processing the pixel run color information from the first-in first-out buffer 15.

If, in response to ENC RL (14:4) encoded run length information from first-in first-out buffer 15, the zero/one detector circuit 316 negates the CTR 0/1 counter zero/one output signal, the pixel run extends beyond thirty-two bits. In that case, the control circuit (not shown) also enables the high-order color creation logic circuit 306 to generate HI COL (15:0) high-order color signals in response to the asserted HI ALL signal, and asserts the LAT HI COL WD latch high-order color word signal to enable the high-order latch 314 to latch them. The control circuit then asserts the SEL HI WD select high-order word signal and the PXL OUT EN pixel information output enable signal which together enable multiplexer 315 to transmit the LAT HI COL 15:0) latched high-order color signals as the PXL OUT (15:0) pixel output signals.

The control circuitry then asserts a CTR CLK counter clock signal which enables the counter 302 to decrement by one. The zero/one detect circuit 316 conditions the CTR 0/1 counter zero/one signal in response to the new binary value of the CTR OUT counter output signals. Thus, if the binary value of CTR OUT counter output signals is not zero or one, the zero/one detect circuit 316 maintains the CTR 0/1 counter zero/one signal in an asserted condition and the sequence described above is repeated, this time using the low order color creation logic circuitry 307 and an asserted LO ALL low-order enabling signal. The sequence is repeated as long as the CTR 0/1 counter zero/one signal is negated. When the counter 302 counts down to a point at which the CTR 0/1 counter zero/one signal is finally asserted, the run-length decoder 16 operates as described above. Thus, the run-length decoder 16 operates iteratively to generate sequential sixteen bit PXL OUT (15:0) pixel out words in response to the condition of the CTR 0/1 counter zero/one signal from zero/one detector logic 316 and the CARRY signal from adder 304.

It will be appreciated by those skilled in the art that the control circuitry (not shown) which controls the run-length decoder 16 may be implemented in a known manner by means of a conventional microprocessor or state machine.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. Image decoding apparatus for sequentially decoding image information encoded in a sequence of image information symbols, defining a series of lines, the image information symbols including one-dimensional encoding symbols each identifying a run-length identifying the number of pixels in a run in the image and a color value identifying the color of the pixels in a run, and a two-dimensional encoding symbols each identifying a transition displacement value, said apparatus comprising:

A. a relative address decoder, including:
  i. a reference line information store for storing a plurality of entries of run length and color information from a previous line,
  ii. a current line information store for storing a plurality of entries of run length and color information from a current line; and
  iii. a processor for processing each information symbol in relation to information in said reference line and said current line store to determine said transition displacement values and generate run length and color values for said current line, said processor storing said generated run-length and color value in said current line store means; and
B. run-length decoder connected to said relative address decoder for iteratively processing the successive run-length information items and generating, in response thereto, successive image data words each of predetermined length, each image data work specifying a color value for a pixel in the image.

2. An image decoding apparatus as defined in claim 1 in which said image information symbols are identified by a sequence of binary data bits in Huffman-encoded form, said image decoding apparatus further including Huffman decoding means for receiving each successive binary data bit and generating in response thereto the successive image information symbols for transmission to said relative address decoding means.

3. An image decoding apparatus as defined in claim 2 further comprising symbol first-in first-out buffer means connected between said Huffman decoding means and said relative address decoding means for buffering transfer of successive image information symbols therebetween and run-length information first-in first-out buffer means connected between said relative address decoding means and run-length decoding means for buffering successive run-length information items therebetween.

4. An image decoding apparatus as defined in claim 1 wherein:
A. said relative address decoder further includes:
  i. an accumulator store for providing scratch pad storage;
  ii. a color identifier for generating, in response to each received image information symbol, a color value; and
B. said processor includes:
  i. a dimensional control portion connected to said accumulator store said current line information store and further connected to receive said symbol for generating a run-length value for transmission to said run-length decoder and to generate, in response to the contents of said accumulator store and said symbol, a preliminary run-length value identifying the number of pixels to the previous color transition for storage in said accumulator store; and
  ii. a two-dimensional control portion connected to said accumulator store and said reference line information store and further connected to receive said symbol for generating, in response to the contents of said accumulator store and said symbol, a run-length value for transmission to said run-length decoder and for generating, in response to the contents of a selected location in said reference line information store and said symbol a preliminary run-length value identifying the number of pixels to the previous color transition for storage in said accumulator store.

5. An image decoding apparatus as defined in claim 4 wherein one of said symbols is an end of line symbol, said control means further including end of line control means for enabling the contents of entries in said current line information storage means to be transferred into respective entries in said reference line information storage means.

6. An image decoding apparatus as defined in claim 1 wherein said run length decoding means includes:
A. run pointer generation means connected to said relative address decoding means for receiving the run length information from said relative address decoding means and generating, in response thereto, a pointer value identifying the location, in a data word of predetermined number of bits, of the end of a pixel run; and
B. color information generation means connected to said run pointer control means and said relative address decoding means for generating an output word of said predetermined number of bits in response to said pointer from said run pointer control means and said color value.

7. An image decoding apparatus as defined in claim 6 wherein said run pointer control means successively receives run length information and iteratively generates a pointer value in response thereto, said run pointer generation means comprising:
A. pointer storage means for storing said pointer value;
B. pointer processing means connected to said pointer storage means and said relative address decoding means for generating, in response to the contents of said pointer storage means and said run length information, a pointer value for storage in said pointer storage means; and
C. pointer control means for enabling said pointer processing means to generate a pointer value for storage in said pointer storage means in response to the receipt of run length information.

8. An image decoding apparatus as defined in claim 7 wherein said pointer processing means comprises an adder for adding the contents of said pointer storage means and said run length information.

9. An image decoding apparatus as defined in claim 7 wherein run length information comprises a binary encoded value identifying a run length, the run length information having a low-order portion having a maximum value corresponding to said predetermined number, and a high-order portion, said pointer processing means being responsive to said low-order portion to generate a pointer value having a maximum binary-encoded value corresponding to the predetermined number of bits in said data word,
A. said pointer processing means further including:
  i. pointer counter means for receiving said high order value, ii. pointer decrement means for iteratively decrementing said pointer counter means; and
iii. counter value detection means for generating an output signal when said counter means has a predetermined value;

B. said color information generation means including means connected to said counter value detection means for iteratively conditioning the generation of data words identifying the color value associated with said run length information in response to the output signal from said counter value detection means, and, in response to the generation of each data word, enabling said pointer decrement means to decrement said pointer counter means to thereby generate successive data words in response to the color value.

10. An image decoding apparatus as defined in claim 6 wherein said color information generation means comprises:

A. data word storage means for storing a data word;
B. data word merging means connected to said run pointer generation means and said relative address decoder means for generating a merged data word in response to said pointer value, the contents of said data word storage means and said data value from said relative address decoder, said data word merging means coupling the portion of said data word from said data word storage means below the point identified by said pointer means as a low order portion of said merged data word and a value responsive to said color value as a high order portion of said merged data word; and
C. control means connected to said data word storage means for enabling said data word storage means to latch said merged data word and store it as said data word.

11. An image decoding apparatus as defined in claim 10 wherein said data word comprises a plurality of data bits, said data word merging means comprising:

A. a plurality of multiplexer means, each associated with one of said data bits of said data word, each having a first data input terminal for receiving one of said data bits, a second data input terminal for receiving said color value and an output terminal; and
B. decoding means connected to said run pointer generation means for enabling selected ones of said multiplexer means to couple the respective data bits to their respective output terminals and others of said multiplexer means to couple said color value to their respective output terminals, to thereby form a merged data output word at the collective output terminals of said multiplexer means.

12. A relative address decoder for use in an image decoding apparatus for sequentially decoding image information encoded in a sequence of image information symbols defining a series of liens, the image information symbols including one-dimensional encoding symbols each identifying a run-length identifying the number of pixels in the image and a color value identifying the color of the pixels in a run, and two-dimensional encoding symbols each identifying a transition displacement value, and produce in response thereto run-length information including a run-length value identifying a number of pixels and a color value, said relative address decoder comprising:

A. a relative address decoder portion for generating, in response to each received image information symbol, a run-length value, said relative address decoder portion including:
i. a reference line information store for storing a plurality of entries of run length and color information from a previous line,
ii. a current line information store for storing a plurality of entries of run length and color information from a current line, and
iii. a processor for processing each information symbol in relation to information in said reference line and said current line store to determine said transition displacement values and generate run length and color values for said current line, said processor storing said generated run-length and color value in said current line store; and B. color identification means for generating, in response to each received image information symbol, a color value;
C. transmission means connected to said relative address decoder pattern and said color identification means for receiving said run-length values and associated color values and transmitting them to said run-length decoder; and
D. control means for receiving each image information symbol and for controlling said relative address decoder portion and said color identification means in response to whether said image information symbol is a one-dimensional symbol or a two-dimensional symbol.

13. A relative address decoder as defined in claim 12 in which said image information symbols are identified by a sequence of binary data bits in Huffman-encoded form, further including Huffman decoding means for receiving each successive binary data bit and generating in response thereto the successive image information symbols for transmission to said relative address decoding means.

14. A relative address decoder as defined in claim 13 further comprising first-in first-out buffer means connected between said Huffman decoding means and said relative address decoding means for buffering transfer of successive image information symbols therebetween and run-length information first-in first-out buffer means connected to the output of said relative address decoding means for buffering successive run-length information items therefrom.

15. A relative address decoder as defined in claim 12 wherein:

A. said relative address decoder portion includes:
i. an accumulator store for providing scratch pad storage;
ii. a color identifier for generating, in response to each received image information symbol, a color value; and B. said processor includes:
i. a one dimensional control portion connected to said accumulator store said current line information store and further connected to receive said symbol for generating a run-length value for transmission to said run-length decoder and to generate, in response to the contents of said accumulator store and said symbol, a preliminary run-length value identifying the number of pixels to the previous color transition for storage in said accumulator store; and ii. a two-dimensional control portion connected to said accumulator store and said reference line information store and further connected to receive said symbol for generating, in response to the contents of said accumulator store and said symbol, a run-length value for transmission to said run-length decoder and for generating, in response to the contents of a selected location in said reference line information store and said symbol a preliminary run-length value identifying the number of pixels to the previous color transition for storage in said accumulator store.

16. A relative address decoder as defined in claim 15 further including current line information storage means comprising a plurality of entries, said one-dimensional control means and said two-dimensional control means both including means for enabling the value transmitted to said run length decoding means to be stored in a selected entry in said current line information storage means.

17. A relative address decoder as defined in claim 16 wherein one of said symbols is an end of line symbol, said control means further including end of line control means for enabling the contents of entries in said current line information storage means to be transferred into respective entries in said reference line information storage means.

18. A run length decoder for sequentially decoding image information including run-length information item identifying a run length and a color value, said run-length decoder iteratively processing the successive run-length information items and generating, in response thereto, successive image data words each of predetermined length, each image data word specifying a color value for a pixel in the image, said run length decoder comprising:
   A. run pointer generation means connected to receive the run length information for generating, in response thereto, a pointer value identifying the location, in a data word of predetermined number of bits, of the end of a pixel run; and
   B. color information generation means connected to said run pointer control means for generating an output word of said predetermined number of bits in response to said pointer from said run pointer control means and said color value.

19. A run length decoder as defined in claim 18 wherein said run pointer control means successively receives run length information and iteratively generates a pointer value in response thereto, said run pointer generation means comprising:
   A. pointer storage means for storing said pointer value;
   B. pointer processing means connected to said pointer storage means for generating, in response to the contents of said pointer storage means and said run length information, a pointer value for storage in said pointer storage means; and
   C. pointer control means for enabling said pointer processing means to generate a pointer value for storage in said pointer storage means in response to the receipt of run length information.

20. A run length decoder as defined in claim 21 wherein said pointer processing means comprises an adder for adding the contents of said pointer storage means and said run length information.

21. A run length decoder as defined in claim 19 wherein run length information comprises a binary encoded value identifying a run length, the run length information having a low-order portion having a maximum value corresponding to said predetermined number, and a high-order portion, said pointer processing means being responsive to said low-order portion to generate a pointer value having a maximum binary encoded value corresponding to the predetermined number of bits in said data word,
   A. said pointer processing means further including:
      i. pointer counter means for receiving said high order value,
      ii. pointer decrement means for iteratively decrementing said pointer counter means; and
      iii. counter value detection means for generating an output signal when said counter means has a predetermined value;
   B. said color information generation means including means connected to said counter value detection means for iteratively conditioning the generation of data words identifying the color value associated with said run length information in response to the output signal from said counter value detection means, and, in response to the generation of each data word, enabling said pointer decrement means to decrement said pointer counter means to thereby generate successive data words in response to the color value.

22. A run length decoder as defined in claim 18 wherein said color information generation means comprises:
   A. data word storage means for storing a data word;
   B. data word merging means connected to said run pointer generation means and to receive said color value for generating a merged data word in response to said pointer value, the contents of said data word storage means and said color value, said data word merging means coupling the portion of said data word from said data word storage means below the point identified by said pointer means as a low order portion of said merged data word and a value responsive to said color value as a high order portion of said merged data word; and
   C. control means connected to said data word storage means for enabling said data word storage means to latch said merged data word and store it as said data word.

23. A run length decoder as defined in claim 22 wherein said data word comprises a plurality of data bits, said data word merging means comprising:
   A. a plurality of multiplexer means, each associated with one of said data bits of said data word, each having a first data input terminal for receiving one of said data bits, a second data input terminal for receiving said color value and an output terminal; and
   B. decoding means connected to said run pointer generation means for enabling selected ones of said multiplexer means to couple the respective data bits to their respective output terminals and others of said multiplexer means to couple said color value to their respective output terminals, to thereby form a merged data output word at the collective output terminals of said multiplexer means.

24. A run length decoder for sequentially decoding image information including run-length information item identifying a run length and a data value, said run-length decoder iteratively processing the successive run-length information items and generating, in response thereto, successive image data words each of predetermined length, each image data word specifying a data value for a pixel in the image, said run length decoder comprising:
  A. run pointer generation means connected to receive the run length information for generating, in response thereto, a pointer value identifying the location, in a data word of predetermined number of bits, of the end of a pixel run; and
  B. data information generation means connected to said run pointer control means for generating an output word of said predetermined number of bits in response to said pointer from said run pointer control means and said data value.

25. A run length decoder as defined in claim 24 wherein said run pointer control means successively receives run length information and iteratively generates a pointer value in response thereto, said run pointer generation means comprising:
  A. pointer storage means for storing said pointer value;
  B. pointer processing means connected to said pointer storage means for generating, in response to the contents of said pointer storage means and said run length information, a pointer value for storage in said pointer storage means; and
  C. pointer control means for enabling said pointer processing means to generate a pointer value for storage in said pointer storage means in response to the receipt of run length information.

26. A run length decoder as defined in claim 25 wherein said pointer processing means comprises an adder for adding the contents of said pointer storage means and said run length information.

27. A run length decoder as defined in claim 25 wherein run length information comprises a binary encoded value identifying a run length, the run length information having a low-order portion having a maximum value corresponding to said predetermined number, and a high-order portion, said pointer processing means being responsive to said low-order portion to generate a pointer value having a maximum binary encoded value corresponding to the predetermined number of bits in said data word,
  A. said pointer processing means further including:
    i. pointer counter means for receiving said high order value,
    ii. pointer decrement means for iteratively decrementing said pointer counter means; and
    iii. counter value detection means for generating an output signal when said counter means has a predetermined value;
  B. said data information generation means including means connected to said counter value detection means for iteratively conditioning the generation of data words identifying the data value associated with said run length information in response to the output signal from said counter value detection means, and, in response to the generation of each data word, enabling said pointer decrement means to decrement said pointer counter means to thereby generate successive data words in response to the data value.

28. A run length decoder as defined in claim 24 wherein said data information generation means comprises:
  A. data word storage means for storing a data word;
  B. data word merging means connected to said run pointer generation means and to receive said data value for generating a merged data word in response to said pointer value, the contents of said data word storage means and said data value, said data word merging means coupling the portion of said data word from said data word storage means below the point identified by said pointer means as a low order portion of said merged data word and a value responsive to said data value as a high order portion of said merged data word; and
  C. control means connected to said data word storage means for enabling said data word storage means to latch said merged data word and store it as said data word.

29. A run length decoder as defined in claim 28 wherein said data word comprises a plurality of data bits, said data word merging means comprising:
  A. a plurality of multiplexer means, each associated with one of said data bits of said data word, each having a first data input terminal for receiving one of said data bits, a second data input terminal for receiving said data value and an output terminal; and
  B. decoding means connected to said run pointer generation means for enabling selected ones of said multiplexer means to couple the respective data bits to their respective output terminals and others of said multiplexer means to couple said data value to their respective output terminals, to thereby form a merged data output word at the collective output terminals of said multiplexer means.

30. Image decoding apparatus for sequentially decoding image information encoded in a sequence of image information encoded in a sequence of image information symbols, including one-dimensional encoding symbols each identifying a run-length identifying the number of pixels in a run in the image and a color value identifying the color of the pixels in a run, and two-dimensional encoding symbols each identifying a transition displacement value, said apparatus comprising:
  A. relative address decoding means for iteratively processing each image information symbol, including each one-dimensional encoding symbol and each two-dimensional encoding symbol, and generating in response thereto a run-length information item identifying a run-length and a color value; and
  B. run-length decoding means connected to said relative address decoding means for iteratively processing the successive run-length information items and generating, in response thereto, successive image data words each of predetermined lengths, each image data word specifying a color value for a pixel in the image, said run-length decoding means including:
    (a) run pointer generation means connected to said relative address decoding means for receiving the run-length information from said relative address decoding means and generating, in response thereto, a pointer value identifying the location, in a data word of a predetermined number of bits, of the end of a pixel run; and
    (b) color information generation means connected to said run pointer control means and said relative address decoding means for generating an output word of said predetermined number of bits in response to said pointer from said run pointer control means and said color value.

* * * * *

UNITED STATES PATENT AND TRADEMARK OFFICE
CERTIFICATE OF CORRECTION

PATENT NO. : 4,968,135

DATED : November 6, 1990

INVENTOR(S) : Wallace et al.

It is certified that error appears in the above-identified patent and that said Letters Patent is hereby corrected as shown below:

Column 7, line 31; after "(step 101)" insert --(Note that "INPUT FIFO1" means to fetch the next READ code, if available, from the output of FIFO1; see Fig. 1)--

Column 7, line 35; after "12." insert --The term "EOL" in Fig. 4A means that the branch is taken when "End-of-Line" is reached. It is identical to the (PIX=LL) condition shown in Fig. 2.2.--

Column 7, line 50; "tO" should be --to--.

Column 8, line 6; after "(step 111)." insert --(Note that the accumulator is loaded with a run-length value equal to the image Line-Length (LL), to simulate the imaginary white reference line.)--

Column 9, line 13; after "16" inset --(i.e., the value (A+Vi) is outputted to the next stage, that is, to the input of FIFO2, see Fig. 1)--.

UNITED STATES PATENT AND TRADEMARK OFFICE
CERTIFICATE OF CORRECTION

PATENT NO. : 4,968,135

DATED : November 6, 1990

INVENTOR(S) : Wallace et al.

It is certified that error appears in the above-identified patent and that said Letters Patent is hereby corrected as shown below:

Column 9, line 24; after "below" insert --(EXCEPTION) in Fig. 4C is defined as:
( ((Vi = -3) AND ((REF [n] =1) OR (REF [n] = 2))) OR ((Vi = -2) AND (REF [n] = 1)) ).
Note that (PIX=LL), the EOL condition, and (EXCEPTION) will not occur simultaneously.

Column 9, line 60; after "exists." insert --(CC) is defined as: (COLOR(REF[n])) = COLOR(REF[n-1])).--

Column 10, line 35; after "12." insert --If (CC) and (PIX=LL) occur simultaneously, precedence goes to the (CC) brance.--

Column 10, line 68; insert --.-- after "50".

Column 11, line 60; "FolloWing" should be --following--.

Column 12, line 22; after "(step 181)" insert --Note that "REF COD" in step 181 means the data which had been generated as the coding line now becomes the new reference line data. In practice, two physically separate buffers are unnecessary; a single FIFO can be used.--

UNITED STATES PATENT AND TRADEMARK OFFICE
CERTIFICATE OF CORRECTION

PATENT NO. : 4,968,135

DATED : November 6, 1990

INVENTOR(S) : Wallace et al.

It is certified that error appears in the above-identified patent and that said Letters Patent is hereby corrected as shown below:

Column 12, line 57; after "53." insert --(i.e., the color state variable is toggled if 1Di, the current particular 1D code, is a terminator code)--.

Column 13, line 37; insert --(-- before "FIG 4A).--

Column 15, line 64; "31! (N)" should be --311(N)--.

Column 16, line 49; "S1IM' should be --SUM--

Column 17, line 15; "SE1" should be --SEL--.

Column 20, line 35; claim 7; after "claim 6" insert --30--.

Column 21, line 18; claim 10 after "6" insert --30--.

Column 21, line 59; "liens" should be --lines--.

Column 23, line 63; "21" should be --19--.

Signed and Sealed this

Second Day of February, 1993

Attest:

STEPHEN G. KUNIN

Attesting Officer     Acting Commissioner of Patents and Trademarks